United States Patent [19]

Jouppi

[11] Patent Number: 5,386,547
[45] Date of Patent: Jan. 31, 1995

[54] SYSTEM AND METHOD FOR EXCLUSIVE TWO-LEVEL CACHING

[75] Inventor: Norman P. Jouppi, Palo Alto, Calif.

[73] Assignee: Digital Equipment Corporation, Maynard, Mass.

[21] Appl. No.: 823,671

[22] Filed: Jan. 21, 1992

[51] Int. Cl.⁶ ............................................. G06F 12/02
[52] U.S. Cl. ............................. 395/425; 364/DIG. 1; 364/243.45
[58] Field of Search ............................. 395/400, 425; 364/200 MS File, 900 MS File

[56]  References Cited

U.S. PATENT DOCUMENTS

| | | | |
|---|---|---|---|
| 4,928,239 | 5/1990 | Baum et al. | 395/425 |
| 4,942,518 | 7/1990 | Weatherford et al. | 395/800 |
| 4,974,156 | 11/1990 | Harding et al. | 395/425 |
| 5,201,041 | 4/1993 | Bohner et al. | 395/425 |
| 5,247,639 | 9/1993 | Yamahata | 395/425 |
| 5,261,066 | 11/1993 | Jouppi et al. | 395/425 |

Primary Examiner—Joseph L. Dixon
Assistant Examiner—Hiep T. Nguyen
Attorney, Agent, or Firm—Flehr, Hohbach, Test, Albritton & Herbert

[57] ABSTRACT

A simple mixed first level cache memory system (50) includes a level 1 cache (52) connected to a processor (54) by read data and write data lines (56) and (58). The level 1 cache (52) is connected to level 2 cache (60) by swap tag lines (62) and (64), swap data lines (66) and (68), multiplexer (70) and swap/read Line (72). The level 2 cache (60) is connected to the next lower level in the memory hierarchy by write tag and write data lines (74) and (76). The next lower level in the memory hierarchy below the level 2 cache (60) is also connected by a read data line (78) through the multiplexer (70) and the swap/read line (72) to the level 1 cache (52). When processor (54) requires an instruction or data, it puts out an address on lines (80). If the instruction or data is present in the level 1 cache (52), it is supplied to the processor (54) on read data line (56). If the instruction or data is not present in the level 1 cache (52), the processor looks for it in the level 2 cache (60) by putting out the address of the instruction or data on lines (80). If the instruction or data is in the level 2 cache, it is supplied to the processor (54) through the level 1 cache (52) by means of a swap operation on tag swap lines (62) and (64), swap data lines (66) and (68), multiplexer (70) and swap/read data line (72). If the instruction or data is present in neither the level 1 cache (52) nor the level 2 cache (60), the address on lines (80) fetches the instruction or data from successively lower levels in the memory hierarchy as required via read data line (78), multiplexer (70) and swap/read data line (72). The instruction or data is then supplied from the level 1 cache to the processor (54).

29 Claims, 8 Drawing Sheets

SYSTEM AND METHOD FOR EXCLUSIVE TWO-LEVEL CACHING

BACKGROUND OF THE INVENTION

1. Field of the Invention

The present invention relates generally to a cache memory system and to a method of operating a cache memory system. More particularly, it relates to such a cache memory system and method utilizing a first, small upper level of cache and a second, large lower level of cache. Most especially, it relates to such a cache memory system and method which has the lower latency of a direct-mapped cache on a hit and the lower miss rate of a set-associative cache.

2. Description of the Prior Art

Direct-mapped caches have higher miss rates than set-associative caches but have lower latency than set-associative caches on a hit. Since hits are much more frequent than misses, direct-mapped caches are preferred. The direct-mapped cache has a lower hit rate than a more associative cache because it will have more misses due to accesses which map to the same line in the cache but have different tags. These are called conflict misses. Conflict misses can account for a significant percentage of direct-mapped cache misses.

Two-level cache structures typically have copies of at least some of the data in the first level of cache in the second level of cache. When both the first-level cache and the second-level cache are direct-mapped, mixed, and have the same line size, in conventional systems every cache line in the first-level cache will also be in the second-level cache. In many multiprocessor caching methods, a copy of all data in the first level cache must reside in the second level cache. This is called inclusion.

Two-level cache memory systems in which the two levels are on different integrated circuits have proved to be attractive. For similar reasons, two-level caches on a single integrated circuit are becoming attractive.

Since a significant percentage of direct-mapped cache misses are due to mapping conflicts, it would be nice to "have our cake and eat it too" by somehow providing additional associativity without adding to the critical access path for a direct-mapped cache. The present invention is directed to a technique for achieving this easily, especially in a two-level on-chip cache structure.

SUMMARY OF THE INVENTION

A cache memory system in accordance with this invention has a first-level cache configured to store tags and instructions or data associated with the tags and a second-level cache configured to store tags and instructions or data associated with the tags. The first-level cache and the second-level cache are connected by swap tag lines, swap data lines and swap/read lines. The first level cache is connected to read data and write data lines for connection to a processor. The second level cache is connected to write tag and write data lines for connection to a next lower level in a memory hierarchy. Read data lines are connected from the next lower level in the memory hierarchy to the first-level cache through the swap/read lines and a first multiplexer between a portion of the swap data lines and the swap/read lines. The multiplexer selects the swap data unless the second-level cache misses, in which case the read data is selected.

A method of operating a cache memory system in accordance with this invention includes storing tags and instructions or data associated with the tags in a first-level cache and in a second-level cache. Instruction and data addresses are supplied from a processor to the first-level cache to determine if desired instructions or data are present in the first-level cache. Instruction or data addresses are supplied from the processor to the second-level cache to determine if desired instructions or data are present in the second-level cache. An instruction or data is swapped from the second-level cache to the first-level cache when the instruction or data is not present in the first-level cache and is present in the second-level cache. The instruction or data is read from a lower level in the memory hierarchy directly to the first-level cache when the instruction or data is present in neither the first-level cache nor the second-level cache. In this case, the former contents of the first-level cache are still transferred to the second-level cache.

Depending on the relative size of the first-level cache or caches in comparison to the second-level cache or caches, swapping in accordance with the invention can significantly improve the performance of a second-level cache. Typically, the miss rate of the second-level cache or caches is reduced by 20 percent with swapping. A system with swapping has a performance greater than that of a two-way set-associative cache because of its combination of miss rates a lower cache access time on a hit. The system with swapping has a significant saving in cycles per instruction.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
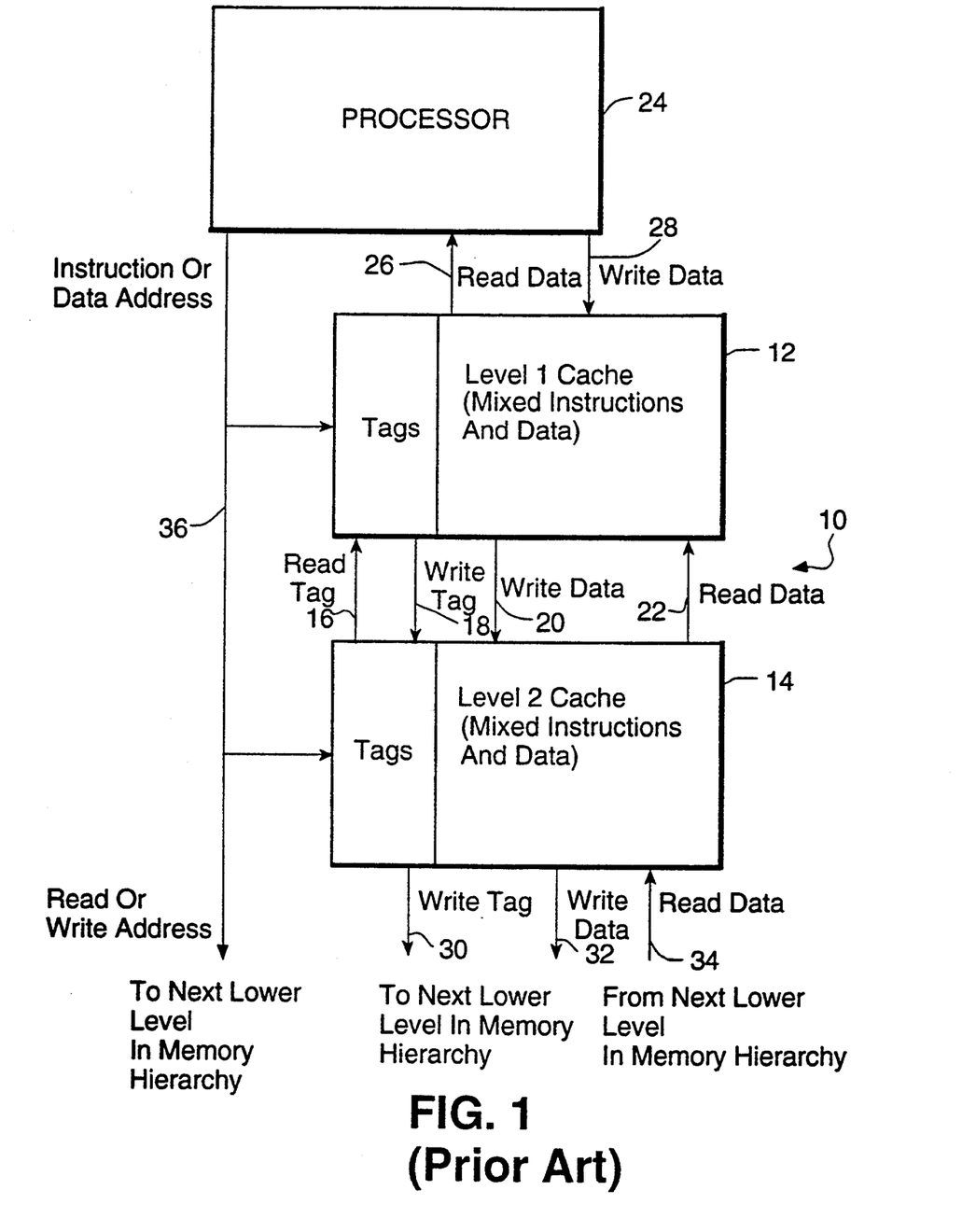
FIG. 1 is a block diagram of a simple prior art cache memory system.

Turning now to the drawings, more particularly to FIG. 1, there is shown a prior art simple mixed two level cache memory system 10. The system 10 has a first, small upper level cache 12 and a second, large lower level cache 14. The cache memory system 10 is mixed because the caches 12 and 14 contain mixed instructions and data. The cache 12 is connected to the cache 14 by read and write tag lines 16 and 18 and read and write data lines 20 and 22. The level 1 cache 12 is connected to a processor 24 by read and write data lines 26 and 28. The level 2 cache 14 is connected to a next lower level in the memory hierarchy by write tag, write data and read data lines 30, 32 and 34. The processor 24 is connected to the level 1 cache 12, the level 2 cache 14 and the next lower level in the memory hierarchy by instruction or data address lines 36.

In operation of the prior an memory cache data system, when the processor 24 requires an instruction or data, it puts out the address for that instruction or data on line 36. If the instruction or data is in the level 1 cache 14, it is supplied directly to the processor 24 from there on read data line 26. If the instruction or data is not present in the level 1 cache, the processor 24 looks for it in the level 2 cache 14. If the instruction or data is found there, it is rippled through the level 1 cache 12 to the processor 24. If the instruction or data is also not present in the level 2 cache 14, the processor looks for it in the next lower level in the memory hierarchy. If it is found there, it is rippled through the level 2 and level 1 caches 14 and 12 to the processor 24. As needed, the processor will look deeper into the memory hierarchy and the instruction or data will be rippled through the intervening levels of the memory hierarchy to the processor 24. As a result of the rippling operation, the information or data will be stored in each level of the memory hierarchy from its original storage location to the processor 24 in accordance with the principle of inclusion. Such prior art memory cache systems 10 are operated either as direct-mapped caches or as set-associative caches.

Figure 2:
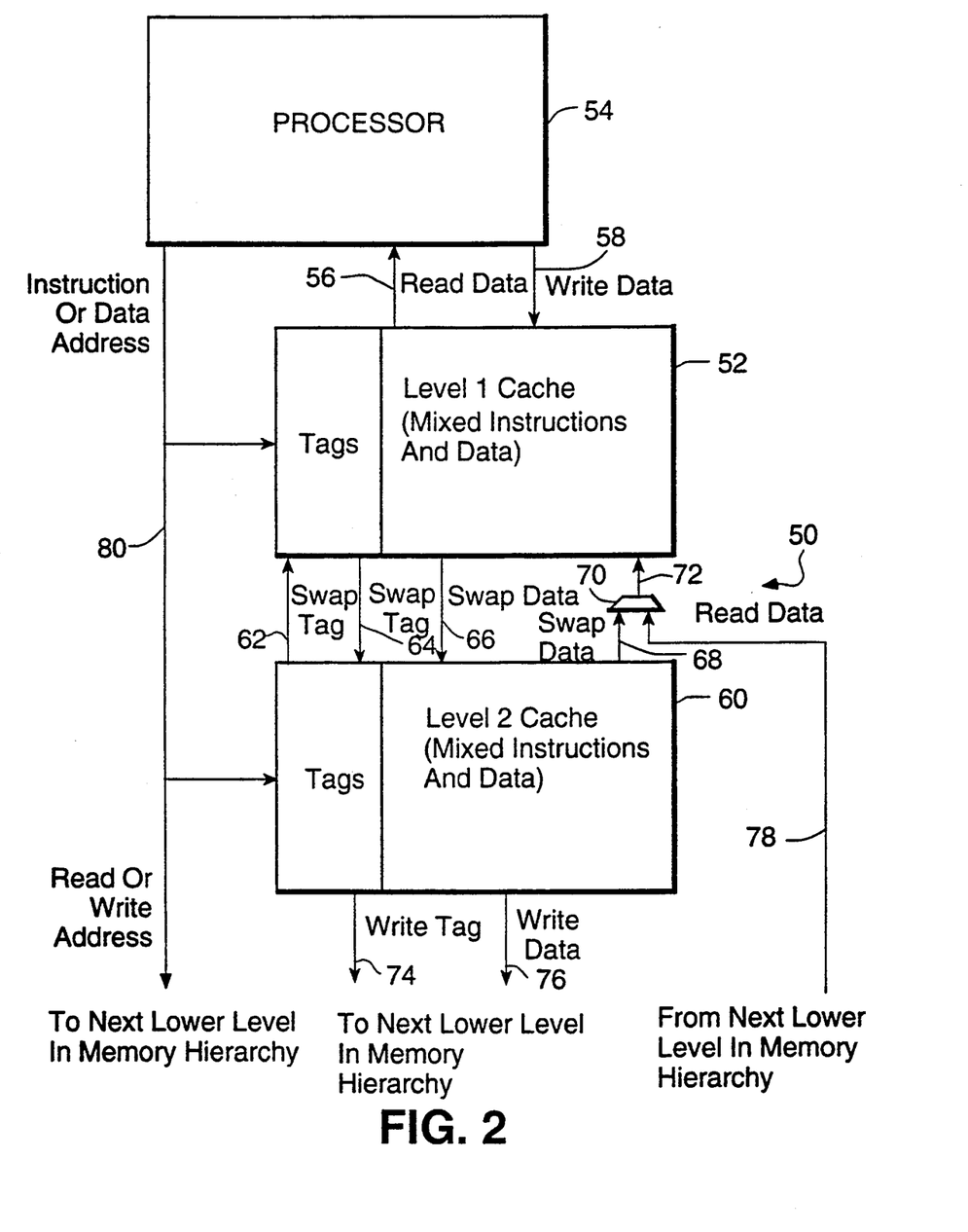
FIG. 2 is a block diagram of a comparable cache memory system in accordance with the invention.

FIG. 2 shows a simple mixed first level cache memory system 50 of the invention. As in the case of the memory system 10, a level 1 cache 52 is connected to a processor 54 by read data and write data lines 56 and 58. However, the level 1 cache 52 is connected to level 2 cache 60 by swap tag lines 62 and 64, swap data lines 66 and 68, multiplexer 70 and swap/read line 72. The multiplexer 70 selects swap data line 68 unless the second-level cache misses, in which case read data line 78 is selected. The level 2 cache 60 is connected to the next lower level in the memory hierarchy by write tag and write data lines 74 and 76. The next lower level in the memory hierarchy below the level 2 cache 60 is also connected by a read data line 78 through the multiplexer 70 and the swap/read line 72 to the level 1 cache 52. The processor 54 is connected to the level 1 cache 52, the level 2 cache 60 and to each level in the memory hierarchy below the level 2 cache 60 by instruction or data address lines 80.

In operation of the cache memory system 50, when processor 54 requires an instruction or data, it puts out an address on lines 80. If the instruction or data is present in the level 1 cache 52, it is supplied to the processor 54 on read data line 56. If the instruction or data is not present in the level 1 cache 52, the processor looks for it in the level 2 cache 60 by putting out the address of the instruction or data on lines 80. If the instruction or data is in the level 2 cache, it is supplied to the processor 54 through the level 1 cache 52 by means of a swap operation on tag swap lines 62 and 64, swap data lines 66 and 68, multiplexer 70 and swap/read data line 72. As a result of the swap operation, the desired instruction or data in the level 2 cache 60 is written into the level 1 cache 52 concurrently with the unwanted data or instruction from the level 1 cache 52 being written to the appropriate location in the level 2 cache 60. The desired instruction or data is then read into the processor 54 from the level 1 cache 52. If the instruction or data is present in neither the level 1 cache 52 nor the level 2 cache 60, the address on lines 80 fetches the instruction or data from successively lower levels in the memory hierarchy as required via read data line 78, multiplexer 70 and swap/read data line 72. The instruction or data is then supplied from the level 1 cache to the processor 54.

Figure 2A:
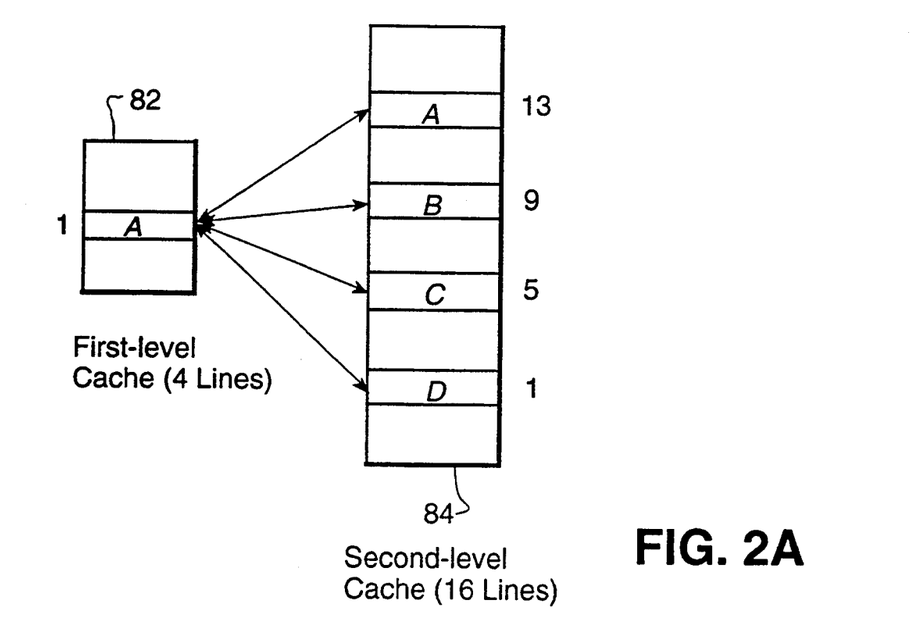
FIGS. 2A and 2B are more detailed block and flow diagrams of a portion of a second embodiment of a cache memory system in accordance with the invention, useful for understanding operation of the invention.
Figure 2B:
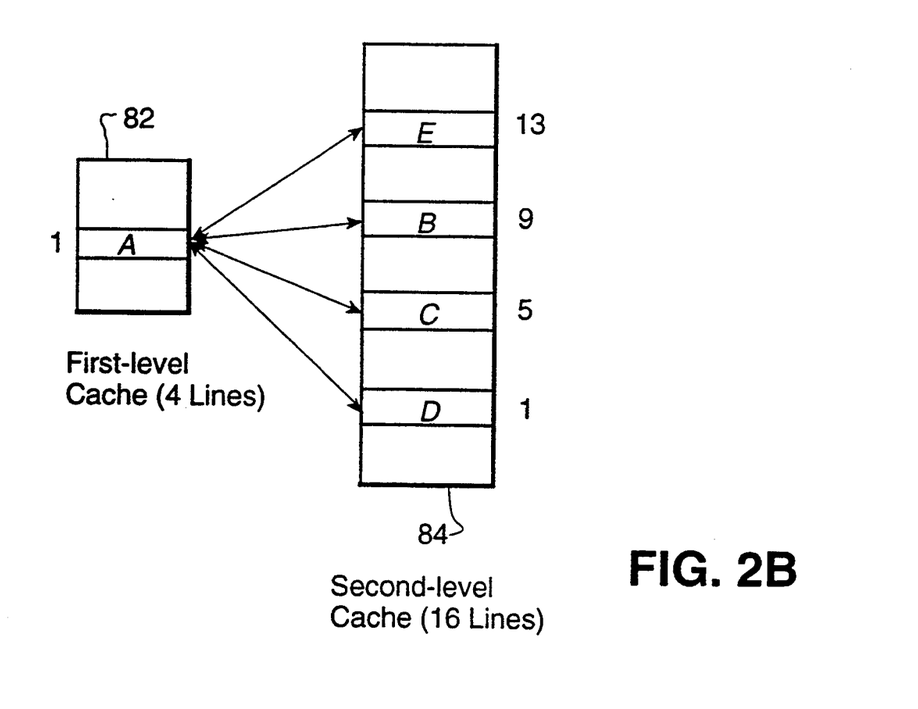

Instead of requiting inclusion between the first-level and second-level on chip cache, consider instead exclusion. In this arrangement, a line that misses in the first-level cache but hits in the second-level cache would swap the unwanted first-level cache line back to the second-level cache at the same time as the desired second-level cache line is fetched from the second-level cache into the first. (Both inclusion and normal practice would copy information from level 2 to level 1.) Note that the unwanted data in the first-level cache may or may not be swapped to the same line as the desired line in the second-level cache, since, if the second-level cache is x times larger than the first, then the item in the first-level cache can map to x different locations in the second-level cache, depending on the tag of the first-level line. Exclusive caching only occurs in this system if mapping conflicts occur in the second-level cache. Thus, mapping conflicts in the first-level cache that do not conflict in the second-level cache do not have exclusion. Consider FIG. 2A. This system shows an example first-level cache 82 with four lines and a second-level cache 84 with 16 lines. If address A is referenced, followed by a reference to address B, swapping data at address A back to the second-level cache 84 will leave the second-level cache 84 unchanged. (If both caches are write-back, then the contents of address A in the second-level cache 84 will be updated from the contents of the first, but the address mapping will stay the same.) Similarly, if references are made to addresses C and D, inclusion will still occur between the first-level cache 82 and the second-level cache 84. Only references that are made to addresses that map to the same second-level cache line create exclusion (See FIG. 2B.) For example, if a reference is made to address A which maps to line 13 in the second-level cache 84, followed by a reference to address E which also maps to line 13 in the second-level cache 84, then both lines A and E can be stored in the first and second-level caches 82 and 84, while a conventional system could only store either A or E. If references to A and E alternate, they will repeatedly change places between the first and second-level caches 82 and 84.

The simplest exclusion method requires that the line size of the first and second level caches be the same. It also requires that the write policy of both caches be the same, e.g., write-back or write-through. Simplest implementation methods also require both caches to be physically mapped.

By providing limited exclusion between two levels of on-chip cache, a weak analog of set-associativity is provided for the second-level cache. This occurs because the direct-mapped first-level cache has fewer lines than the larger second-level cache, so that many lines in the second-level cache swap to the same line in the first-level cache. However, conflict misses tend to be localized to a small percentage of cache lines at any point in time, so this limited amount of associativity is almost as effective as having a two-way set-associative 2nd-level cache. Two-way set-associativity often provides the same hit rate as a direct-mapped cache of twice the capacity.

Figure 3:
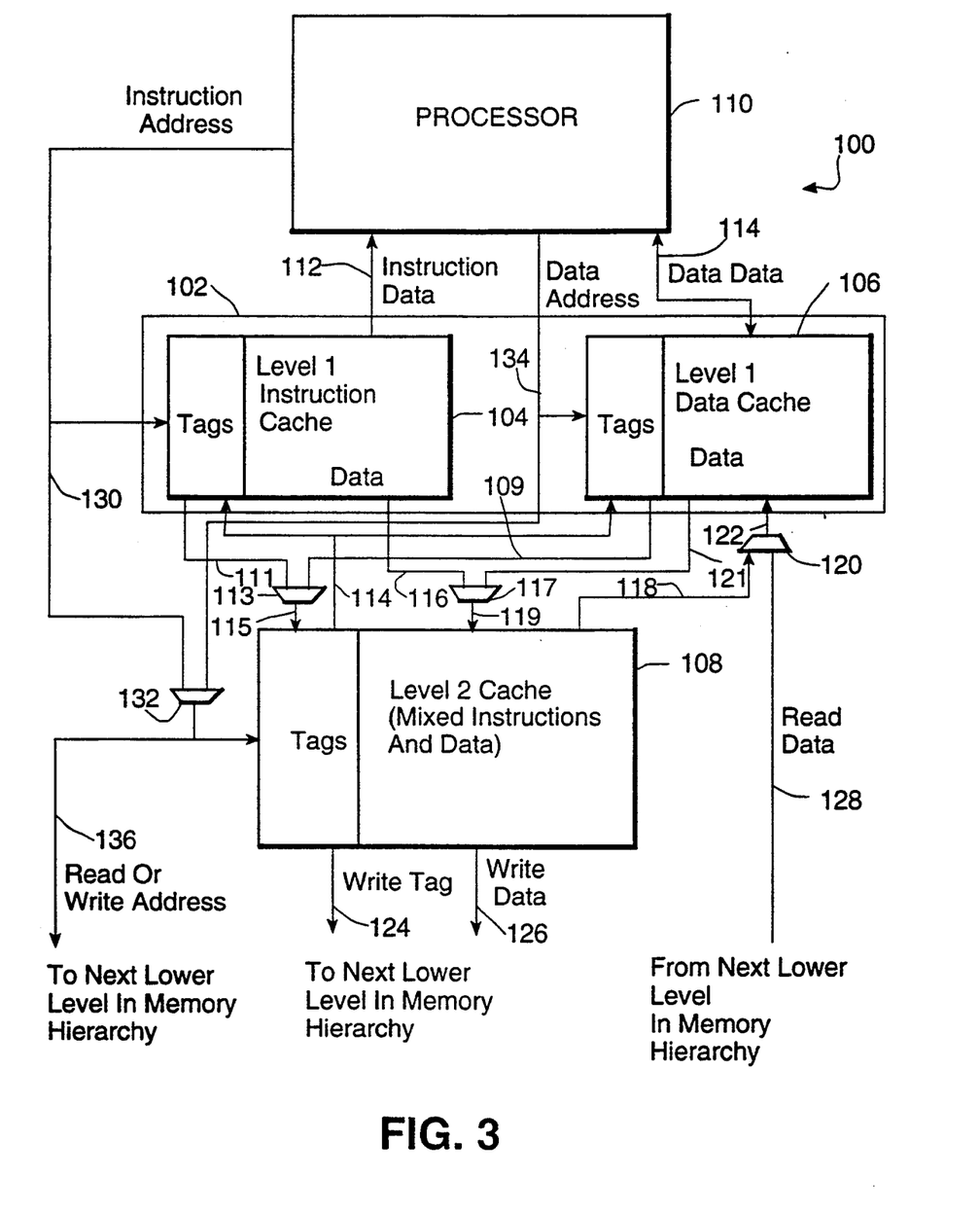
FIG. 3 is a block diagram of a third embodiment of a cache memory system in accordance with the invention.

As shown in FIG. 3, the exclusion method can also be used in a cache memory system 100 with a first-level cache 102 split into separate instruction and data direct-mapped caches 104 and 106, but with a second-level cache 108 containing both instructions and data, i.e., mixed. The level 1 instruction cache 104 is connected to processor 110 by instruction data lines 112. The level 1 data cache 106 is connected to the processor 110 by data data lines 114. The level 1 cache 102 is connected to the level 2 cache 108 by swap tag lines 114, swap tag lines 109, swap tag lines 111, multiplexer 113, swap tag lines 115, swap data lines 116, swap data lines 121, multiplexer 117, swap data lines 119, swap data lines 118, multiplexer 120 and swap/read data lines 122. The next lower level in the memory system hierarchy is connected to the level 1 data cache by read data lines 128, multiplexer 120 and swap/read data lines 122. The multiplexer 113 selects instruction tags from level 1 instruction cache 104 or data tags from level 1 data cache 106, as required for swapping with instruction or data tags in the level 2 cache 108. The multiplexer 117 selects instructions from level 1 instruction cache 104 or data from level 1 data cache 106, as required for swapping with instructions or data in the level 2 cache 108. The multiplexer 120 selects swap data lines 118 unless the second-level cache 108 misses, in which case the multiplexer 120 selects read data lines 128. The level 2 cache is also connected to the next lower level in the memory system hierarchy by write address and write data lines 124 and 126. The processor 110 is connected to the level 1 instruction cache 104, the level 2 cache 108 and the lower levels of the memory system hierarchy by instruction address lines 130, multiplexer 132 and data address lines 134 and 136. Data address lines 134 are also connected to the level 1 data cache 106. In operation, multiplexer 132 selects the instruction address 130 during an instruction cache miss, and selects the data address 134 during a data cache miss.

In operation, cache lines will only be transferred to the first level caches 104 and 106 as requested. Thus, dirty data lines will not be loaded into the instruction cache 104 unless actually referenced as instructions, which is an error. Similarly, instruction cache lines will not be placed in the first-level data cache 106 (also not allowed by the virtual memory protection modes). In this case, the equivalent of three-way set-associativity may be provided for some of the lines in the second-level cache. Of course, this three-way associativity requires at least one instruction and data entry in each set at all times. Other than as shown and described, the construction and operation of the FIG. 3 embodiment of the invention is the same as that of the FIG. 2 embodiment.

The basic configuration and method of the FIG. 3 system can be extended to have virtual instruction caching and physical data cache dam by the addition of a bit per line of the mixed cache. This bit indicates whether the line is instruction or dam, i.e., equivalently whether its address is physical or virtual. Methods with both virtual instruction and dam addressing can also be constructed.

Figure 4:
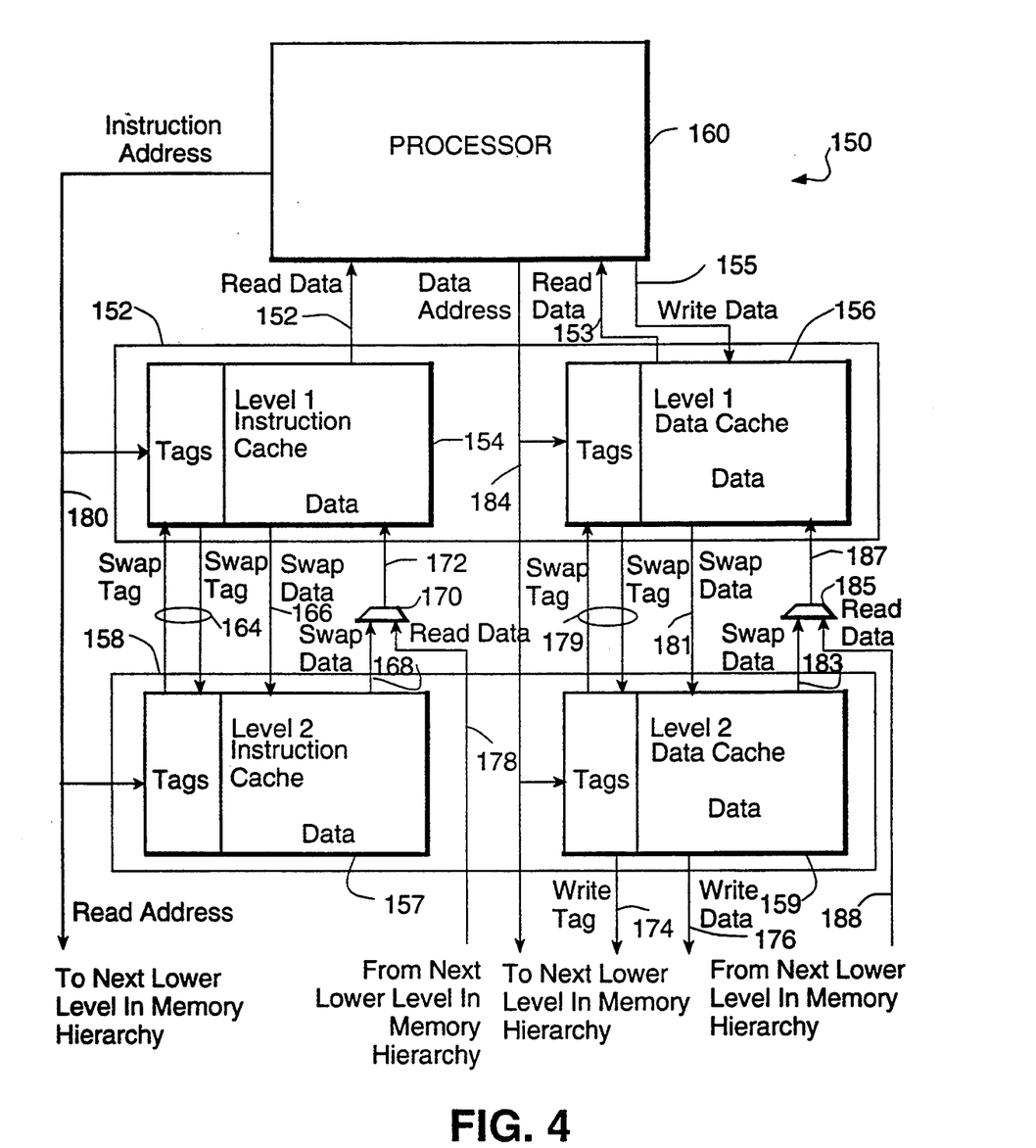
FIG. 4 is a block diagram of a fourth embodiment of a cache memory system in accordance with the invention.

FIG. 4 shows a cache memory system 150 with a first-level cache 152 split into separate instruction and data direct-mapped caches 154 and 156, and a second-level cache 158, also split into separate instruction and data direct-mapped caches 157 and 159. The level 1 instruction cache 154 is connected to processor 160 by read data lines 152. The level 1 data cache 156 is connected to the processor 160 by read data lines 153 and write data lines 155. The level 1 cache 152 is connected to the level 2 instruction cache 157 by swap tag lines 164, swap data lines 166, swap data lines 168, multiplexer 170 and swap/read data lines 172. The next lower level in the memory system hierarchy is connected to the level 1 instruction cache 154 by read data lines 178, multiplexer 170 and swap/read data lines 172. The multiplexer 170 selects swap data lines 168 unless the second-level instruction cache 157 misses, in which case the multiplexer 170 selects read data lines 178. The level 2 data cache 159 is connected to the level 1 data cache 156 by swap tag lines 179, swap data lines 181, swap data lines 183, multiplexer 185 and swap/read data lines 187. The level 2 data cache 159 is also connected to the next lower level in the memory system hierarchy by write tag and write data lines 174 and 176. The multiplexer 185 selects swap data lines 183 unless the second-level dam cache 159 misses, in which case the multiplexer 185 selects read data lines 188. The processor 160 is connected to the level 1 instruction cache 154, the level 2 instruction cache 157, the level 1 data cache 156, the level 2 data cache 159 and the lower levels of the memory system hierarchy by instruction address lines 180 and data address lines 184. Other than as shown and described, the construction and operation of the FIG. 4 embodiment of the invention is the same as that of the FIG. 3 embodiment.

A more complicated extension to the basic method can allow cache lines of different sizes. In this extension, valid bits must be provided on the granularity of the smallest cache line. When data is swapped from a larger cache line to a smaller cache line, the excess data is discarded. (If the cache is write-back and the data is dirty, the discarded dirty data must be queued to be transferred to the next lower level in the memory hierarchy off-chip.) When swapping from a smaller line to a larger line, the valid bits in the larger line corresponding to the data not provided from the smaller line must be turned off.

Note that maintaining exclusion within a set of on-chip caches does not prevent inclusion from being maintained between the data on-chip and lower cache levels off-chip for the purposes of multiprocessor cache consistency.

The following simulation results were obtained by modifying an instruction-level processor and cache simulator. Each experiment involved simulating the benchmarks, and not analyzing trace tapes. The characteristics of the test programs used in this study are given in the following table.

| program name | dynamic instr. | data reads | data writes | total refs. | program type |
| --- | --- | --- | --- | --- | --- |
| ccom | 31.5M | 8.3M | 5.7M | 45.5M | C compiler |
| grr | 134.2M | 42.1M | 17.1M | 193.4M | PC board CAD tool |
| yacc | 51.0M | 12.9M | 3.8M | 67.7M | Unix utility |
| met | 99.4M | 36.4M | 13.8M | 149.7M | PC board CAD tool |
| linpack | 144.8M | 28.1M | 12.1M | 185.5M | numeric, 100 × 100 |
| liver | 23.6M | 5.0M | 2.3M | 31.0M | Livermore loops 1–14 |

Figure 5:
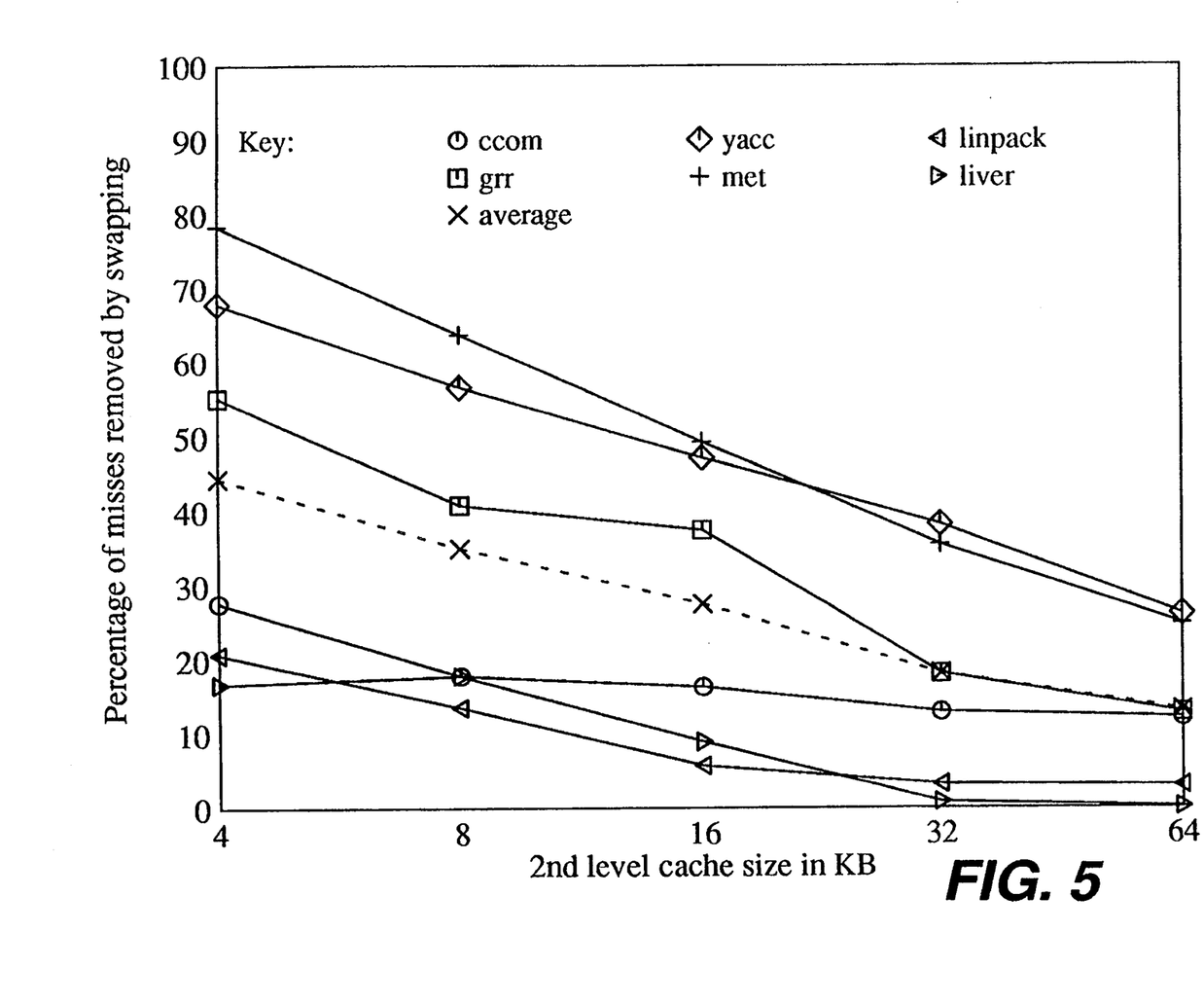
FIGS. 5-7 are graphs of results obtained with simulations of the invention.

Depending on the relative size of the first-level cache(s) in comparison to the second level cache(s), swapping in accordance with the invention can significantly improve the performance of a second-level cache. FIG. 5 shows the reduction in second-level cache miss rate for a system with two 4KB caches and a mixed second level cache of various sizes. This data also assumes 16B lines in both the first-level cache and the second-level cache. On average over the six benchmarks used, for systems with a 4:1 ratio in second-level cache size to total first-level cache size (i.e., 32KB vs. two 4KB caches), the miss rate of the second-level cache is reduced by 20% by swapping. As the ratio in cache sizes gets smaller, the benefits of swapping increase. A swapping system with second-level cache only as large as each first-level cache can still be useful in some circumstances. In a conventional system, this would not make sense, since all misses in the first-level cache would also miss in the second-level cache if they were the same size.

Figure 6:
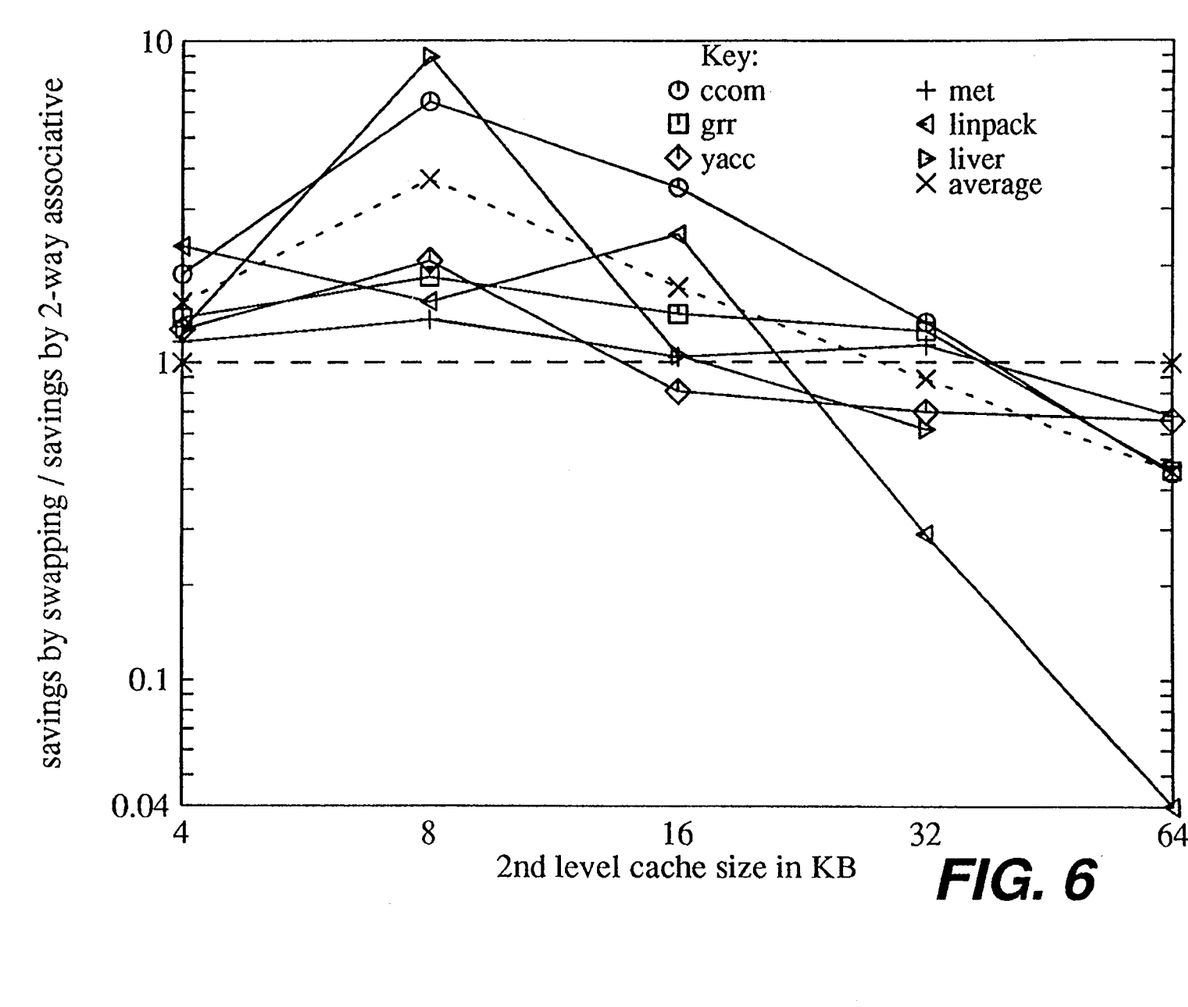

FIG. 6 shows the miss rate reduction of a swapping system over a direct-mapped cache relative to a conventional system with a two-way set associative second-level cache. All systems are assumed to use 16B cache lines, and have separate 4KB instruction and data caches. On average, a direct-mapped system with swapping outperforms a system with a two-way set-associative second level cache for ratios of primary to secondary cache sizes of 4:1 or less (i.e., total capacities of 2:1 or less since there are dual 4KB primary caches.) For systems with dual 4 KB primary caches and a 32KB second-level cache, a system with swapping has about the same reduction in miss rate as a two-way set-associative cache. For ratios larger than 16:1, the set associative cache has a lower miss rate. However, the performance of the swapping system can still be greater, even at larger ratios, since it has the lower cache access time on a hit of a direct-mapped cache in comparison to the slower access time of a set-associative cache.

Figure 7:
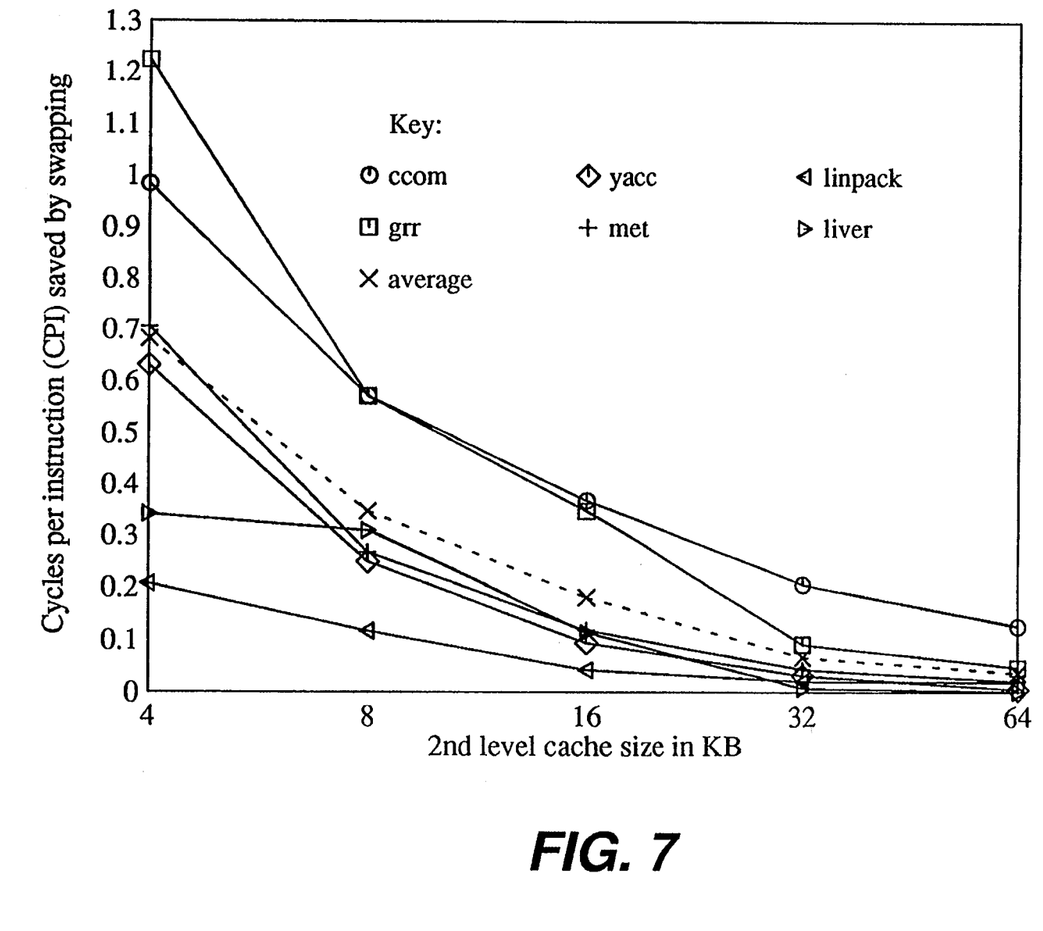

FIG. 7 gives the overall cycles per instruction (CPI) saved by swapping over a conventional direct-mapped cache for 4KB split primary caches, 16B lines, and various second-level cache sizes. These simulations assume a 7 cycle first-level cache miss penalty, and a 20 cycle second-level cache miss penalty. Typically, machines require a total cycles per instruction of 1.5 to 2. Therefore, even with a second-level cache size of 32KB, the savings of almost 0.1 CPI can still be a significant improvement in machine performance.

It should be apparent to those skilled in the art that various changes in form and details of the invention as shown and described may be made. The tag and data lines 62, 64, 164, 166, 168 and 172, for example, shown in FIGS. 2 and 4 as unidirectional, could be replaced with bidirectional lines by using separate operation cycles for transfer in each direction. It is intended that such changes be included within the spirit and scope of the claims appended hereto.

What is claimed is:

1. A cache memory system, which comprises:
   a first-level cache configured to store tags and data associated with the tags,
   a second-level cache configured to store tags and data associated with the tags, said second level cache having a memory capacity at least half as large as that of said first-level cache,
   a next lower-level memory configured to receive tags and store data associated with the tags,
   a multiplexer for receiving said data from said second-level cache and said next lower-level memory,
   said first-level cache and said second-level cache being connected by first swap tag line and first swap data line, said first swap tag line and said first swap data line for transferring discarded tags and data associated with discarded tags from said first-level cache to said second level cache,
   said first-level cache and said second-level cache connected by a second swap data line coupled via said multiplexor, said second swap data line connected to a first input of said multiplexor whose output is coupled to said first-level cache, said second swap data line for transferring data from said second-level cache to said first-level cache,
   said first level cache being connected to read data and write data lines for connection to a processor,
   said second-level cache being connected to write tag and write data lines for connection to said next lower-level memory,
   read data lines connected from the next lower level memory to a second input of said multiplexor for transferring data directly to said first-level cache,
   whereby upon a hit in said second-level cache or said next-lower level memory, said multiplexor transfers data directly into said first level cache while simultaneously said first-level cache writes said discarded tags and data associated with the discarded tags to said second-level cache.

2. The cache memory system of claim 1 in which said second-level cache is configured to store mixed instructions and data, and wherein said second-level cache is a direct mapped cache having a memory capacity larger than said first-level cache.

3. The cache memory system of claim 2 in which said first-level cache is configured to store mixed instructions and data.

4. The cache memory system of claim 3 in which said first-level cache and said second-level cache are connected to data address lines for connection to the processor.

5. The cache memory system of claim 2 in which said first-level cache comprises separate instruction and data caches.

6. The cache memory system of claim 5 in which said separate data cache is connected to data address lines for connection to the processor.

7. The cache memory system of claim 6 in which said data address lines are further connected to said second-level cache through a second multiplexer.

8. The cache memory system of claim 7 in which instruction address lines for connection to the processor are connected to said separate instruction cache and to said second-level cache through said second multiplexer.

9. The cache memory system of claim 8 and a processor connected to said read data and write data lines, said data address lines and said instruction address lines.

10. The cache memory system of claim 5 in which said second-level cache comprises separate instruction and data caches.

11. The cache memory system of claim 10 in which said separate data caches of said first-level cache and said second-level cache are connected to data address lines for connection to the processor.

12. The cache memory system of claim 11 in which said separate instruction caches of said first-level cache and said second-level cache are connected to instruction address lines for connection to the processor.

13. The cache memory system of claim 12 and a processor connected to said read data and write data lines, said data address lines and said instruction address lines.

14. The cache memory system of claim 1 in which said first-level cache contains a first given number of lines and said second-level cache contains a second given number of lines, the second given number of lines being an integral multiple greater than the first given number of lines.

15. The cache memory system of claim 14 in which said memory system is configured to exclude those references to addresses that map to a same second-level cache line from said second-level cache and to include those references to addresses that map to different second-level cache lines in said second-level cache.

16. The cache memory system of claim 1 and a processor connected to said read data and write data lines.

17. A method of operating a cache memory system, which comprises:

storing tags, and data associated with the tags, in a first-level cache and in a second-level cache, said second-level cache having a memory capacity at least half as large as that of said first-level cache, supplying data addresses from a processor to the first-level cache to determine if desired data are present in the first-level cache, supplying data addresses from a processor to the second-level cache to determine if desired data are present in the second-level cache, simultaneously swapping said desired data from the second level cache with a discarded data from the first level cache while also transferring a tag associated with said discarded data to said second level cache when the data is not present in the first-level cache and is present in the second-level cache, and reading the data from a lower level in the memory hierarchy directly to the first-level cache when the data is present in neither the first-level cache nor the second-level cache while simultaneously transferring said discarded data and associated tag from said first-level cache to said second-level cache.

18. The method of operating a cache memory system of claim 17 in which instructions and data are stored in the second-level cache as mixed instructions and data, and said second-level cache is a direct mapped cache having a memory capacity larger than said first-level cache.

19. The method of operating a cache memory system of claim 18 in which instructions and data are stored in the first-level cache as mixed instructions and data.

20. The method of operating a cache memory system of claim 18 in which instructions and data are stored in the first-level cache in separate instruction and data caches.

21. The method of operating a cache memory system of claim 20 in which instructions and data are stored in the second-level cache in separate instruction and data caches.

22. The method of operating a cache memory system of claim 17 in which references to addresses that map to a same second-level cache line are excluded from said second-level cache and those references to addresses that map to different second-level cache lines are included in said second-level cache.

23. A cache memory system, which comprises:

a first-level cache configured to store tags and instructions associated with the tags, a second-level cache configured to store tags and instructions associated with the tags, said second-level cache having a memory capacity at least half as large as that of said first-level cache, a next lower-level memory configured to receive tags and store instructions associated with the tags, a multiplexor for receiving said instructions from said second-level cache and said next lower-level memory, said first-level cache and said second-level cache being connected by a first swap tag line and first swap instruction line, said first swap tag line and said first swap instruction line for transferring discarded tags and instructions associated with the discarded tags from said first-level cache to said second level cache, said first-level cache and said second-level cache being connected by a second swap instruction line coupled via said multiplexor, said second swap instruction line connected to a first input of said multiplexor whose output is coupled to said first-level cache, said second swap instruction line for transferring instructions from said second-level cache to said first-level cache, said first level cache being connected to read instruction and write instruction lines for connection to a processor, said second-level cache being connected to write tag and write instruction lines for connection to said next lower-level memory, read instruction lines connected from the next lower level memory to a second input of said multiplexor for transferring instructions directly to said first-level cache, whereby upon a hit in said second-level cache or said next-lower level memory, said multiplexor transfers instructions directly into said first level cache while simultaneously said first-level cache writes said discarded tags and instructions associated with the discarded tags to said second-level cache.

24. The cache memory system of claim 23 wherein said second-level cache is a direct mapped cache having a memory capacity larger than said first-level cache.

25. A method of operating a cache memory system, which comprises:

storing tags, and instructions associated with the tags, in a first-level cache and in a second-level cache, said second-level cache having a memory capacity at least half as large as that of said first-level cache, supplying instruction addresses from a processor to the first-level cache to determine if desired instructions are present in the first-level cache, supplying instruction addresses from a processor to the second-level cache to determine if desired instructions are present in the second-level cache, simultaneously swapping said desired instructions from the second level cache with a discarded instruction from the first level cache while also transferring a tag associated with said discarded instruction to said second level cache when the desired instruction is not present in the first-level cache and is present in the second-level cache, and reading the instruction from a lower level in the memory hierarchy directly to the first-level cache when the instruction is present in neither the first-level cache nor the second-level cache while simultaneously transferring said discarded instruction and associated tag from said first-level cache to said second-level cache.

26. The method of operating a cache memory system of claim 25 wherein said second-level cache is a direct mapped cache having a memory capacity larger than said first-level cache.

27. A cache memory system, which comprises:
a first-level cache configured to store tags and data associated with the tags,
a second-level cache configured to store tags and data associated with the tags, said second-level cache having a memory capacity at least half as large as that of said first-level cache,
a next lower-level memory configured to receive tags and store data associated with the tags,
connection logic including a first data path for transferring data and associated tags from said first-level cache to said second-level cache and a second data path for receiving said data from said second-level cache and said next lower-level memory and transferring said data to said first-level cache,
said first level cache being connected to read data and write data lines for connection to a processor,
said second-level cache being connected to write tag and write data lines for connection to said next lower-level memory,
whereby upon a hit in said second-level cache or said next-lower level memory, said connection logic transfers data directly into said first level cache while simultaneously said first-level cache writes a discarded tag and data associated with the discarded tag to said second-level cache.

28. The cache memory system of claim 27, wherein said second-level cache has a memory capacity larger than said first-level cache.

29. The cache memory system of claim 27 wherein said second-level cache is a direct mapped cache having a memory capacity larger than said first-level cache.

* * * * *

UNITED STATES PATENT AND TRADEMARK OFFICE
CERTIFICATE OF CORRECTION

PATENT NO. : 5,386,547
DATED : January 31, 1995
INVENTOR(S) : Norman P. Jouppi It is certified that error appears in the above-identified patent and that said Letters Patent is hereby corrected as shown below:

Column 8,
Line 2, after "by" insert -- a --

Signed and Sealed this

Twenty-first Day of June, 2005

JON W. DUDAS
*Director of the United States Patent and Trademark Office*